United States Patent
Raichur et al.

(10) Patent No.: US 9,256,677 B2
(45) Date of Patent: *Feb. 9, 2016

(54) DYNAMIC INDEX AND SEARCH ENGINE SERVER

(75) Inventors: Arvind Raichur, Albuquerque, NM (US); Becky D. Raichur, Albuquerque, NM (US)

(73) Assignee: DISE TECHNOLOGIES, LLC, Albuquerque, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/611,762

(22) Filed: Nov. 3, 2009

(65) Prior Publication Data

US 2010/0114950 A1 May 6, 2010

Related U.S. Application Data

(63) Continuation of application No. 11/932,386, filed on Oct. 31, 2007, now Pat. No. 8,504,554, which is a continuation-in-part of application No. 09/641,031, filed on Aug. 16, 2000, now Pat. No. 7,613,992.

(60) Provisional application No. 60/149,322, filed on Aug. 16, 1999.

(51) Int. Cl.
*G06F 17/30* (2006.01)

(52) U.S. Cl.
CPC ................ *G06F 17/30864* (2013.01)

(58) Field of Classification Search
USPC ................ 707/741, 738, 737, 736, 705, 758, 707/999.001, 999.003, 999.1–999.102
See application file for complete search history.

(56) References Cited

U.S. PATENT DOCUMENTS

| | | | |
|---|---|---|---|
| 5,544,354 | A | 8/1996 | May et al. |
| 5,551,027 | A | 8/1996 | Choy et al. |
| 5,649,186 | A | 7/1997 | Ferguson |
| 5,652,880 | A | 7/1997 | Seagraves |
| 5,685,003 | A | 11/1997 | Peltonen et al. |
| 5,708,825 | A | 1/1998 | Sotomayor |
| 5,721,897 | A | 2/1998 | Rubinstein |
| 5,748,954 | A | 5/1998 | Mauldin |
| 5,781,904 | A | 7/1998 | Oren et al. |

(Continued)

FOREIGN PATENT DOCUMENTS

| | | |
|---|---|---|
| WO | 2008009515 | 1/2008 |
| WO | 2011/056169 | 5/2011 |

OTHER PUBLICATIONS

Dayal, Umeshwar , "Database Technology at a Crossroads", *ACM Computing Surveys 28* Dec. 1996.

(Continued)

*Primary Examiner* — Amresh Singh
(74) *Attorney, Agent, or Firm* — Peacock Myers, P.C.; Jeffrey D. Myers

(57) ABSTRACT

An apparatus for, computer software for, and method of providing personalized search capabilities of internet web pages comprising providing an index server maintaining a dynamic index to internet web pages and employing a tree structured hierarchical plurality of topic categories, permitting a non-administrative end-user to specify any subset of the plurality of topic categories, and adding to an internet web page controlled by the user link information permitting execution of searches of the index server in any category of the subset but only of categories in the subset.

22 Claims, 8 Drawing Sheets

(56) References Cited

U.S. PATENT DOCUMENTS

| | | | |
|---|---|---|---|
| 5,832,495 A | 11/1998 | Gustman | |
| 5,842,206 A | 11/1998 | Sotomayor | |
| 5,848,410 A | 12/1998 | Walls et al. | |
| 5,864,863 A | 1/1999 | Burrows | |
| 5,913,210 A | 6/1999 | Call | |
| 5,920,854 A | 7/1999 | Kirsch et al. | |
| 5,956,722 A | 9/1999 | Jacobson et al. | |
| 5,960,429 A | 9/1999 | Peercy et al. | |
| 5,963,205 A | 10/1999 | Sotomayer | |
| 5,970,489 A | 10/1999 | Jacobson et al. | |
| 5,983,227 A | 11/1999 | Nazem et al. | |
| 6,073,170 A | 6/2000 | Sumita et al. | |
| 6,091,930 A | 7/2000 | Mortimer et al. | |
| 6,199,098 B1 | 3/2001 | Jones et al. | |
| 6,236,987 B1 | 5/2001 | Horowitz et al. | |
| 6,271,846 B1 | 8/2001 | Martinez et al. | |
| 6,314,424 B1 | 11/2001 | Kaczmarski et al. | |
| 6,334,124 B1 | 12/2001 | Bouchard et al. | |
| 6,334,145 B1 | 12/2001 | Adams et al. | |
| 6,338,059 B1 | 1/2002 | Fields et al. | |
| 6,349,307 B1 | 2/2002 | Chen | |
| 6,438,580 B1 | 8/2002 | Mears et al. | |
| 6,457,009 B1 | 9/2002 | Bollay | |
| 6,480,853 B1 | 11/2002 | Jain | |
| 6,493,702 B1 | 12/2002 | Adar et al. | |
| 6,631,496 B1 | 10/2003 | Li et al. | |
| 6,725,227 B1 | 4/2004 | Li | |
| 6,961,731 B2 | 11/2005 | Holbrook | |
| 7,031,961 B2 | 4/2006 | Pitkow et al. | |
| 7,181,438 B1 | 2/2007 | Szabo | |
| 7,613,992 B1 | 11/2009 | Raichur et al. | |
| 7,716,223 B2 | 5/2010 | Haveliwala et al. | |
| 7,801,896 B2 | 9/2010 | Szabo | |
| 7,881,971 B1 | 2/2011 | Nguyen et al. | |
| 7,987,185 B1 | 7/2011 | Mysen et al. | |
| 8,307,275 B2 * | 11/2012 | Clark et al. | 715/206 |
| 8,504,554 B2 | 8/2013 | Raichur et al. | |
| 2002/0016786 A1 | 2/2002 | Pitkow et al. | |
| 2003/0130993 A1 | 7/2003 | Mendelevitch et al. | |
| 2004/0059705 A1 | 3/2004 | Wittke et al. | |
| 2004/0139107 A1 | 7/2004 | Bachman et al. | |
| 2004/0260679 A1 | 12/2004 | Best et al. | |
| 2005/0240580 A1 | 10/2005 | Zamir et al. | |
| 2005/0256866 A1 | 11/2005 | Lu et al. | |
| 2005/0278317 A1 | 12/2005 | Gross et al. | |
| 2005/0289127 A1 | 12/2005 | Giampaolo et al. | |
| 2006/0218208 A1 | 9/2006 | Nagami et al. | |
| 2006/0294192 A1 | 12/2006 | Mao et al. | |
| 2007/0006322 A1 | 1/2007 | Karimzadeh et al. | |
| 2007/0011155 A1 | 1/2007 | Sarkar | |
| 2007/0156636 A1 | 7/2007 | Norton et al. | |
| 2007/0156677 A1 | 7/2007 | Szabo | |
| 2007/0174260 A1 | 7/2007 | Bachman et al. | |
| 2007/0244750 A1 | 10/2007 | Grannan et al. | |
| 2008/0071864 A1 | 3/2008 | Belakovskiy et al. | |
| 2008/0086471 A1 | 4/2008 | Ritter et al. | |
| 2008/0104042 A1 | 5/2008 | Gutt et al. | |
| 2008/0114729 A1 | 5/2008 | Raman et al. | |
| 2008/0195588 A1 | 8/2008 | Kim et al. | |
| 2009/0216805 A1 | 8/2009 | Coffman et al. | |
| 2009/0228482 A1 | 9/2009 | Ye | |
| 2009/0287674 A1 | 11/2009 | Bouillet et al. | |
| 2009/0303546 A1 | 12/2009 | Silverbrook et al. | |
| 2010/0082677 A1 | 4/2010 | Athsani et al. | |
| 2010/0114950 A1 | 5/2010 | Raichur et al. | |
| 2010/0153364 A1 | 6/2010 | Kirby | |
| 2011/0047142 A1 | 2/2011 | Raichur et al. | |

OTHER PUBLICATIONS

Hearst, Marti A. et al., "Cat-a-Cone: An Interactive Interface for Specifying Searches and Viewing Retrieval Results using a Large Category Hierarchy", 1997, 1-10.

Maarek, Yoelle S., "WebCutter: a system for dynamic and tailorable site mapping", *Elsevier Science B.V.* 1997, 1-11.

Stauffer, Todd, "Using HTML 3.2", *Que Publishing, Second Edition* 1996, 53-58.

Baldonado, Michelle Q. W. et al., "SenseMaker: An Information-Exploration Interface Supporting the Contextual Evolution of a User's Interests", CHI 97 Human Factors in Computing Systems, Conference Proceedings, Mar. 22-27, 1997, 1-9.

Barrett, Rob et al., "How to Personalize the Web", CHI 97 Conference Proceedings, ACM, Mar. 22-27, 1997, 1-9.

Card, Stuart et al., "The WebBook and the Web Forager: An Information Workspace for the World-Wide Web", CHI 96 Conference Proceedings, ACM, Apr. 13-18, 1996, 1-8.

Chakrabarti, Soumen et al., "Automatic resource compilation by analyzing hyperlink structure and associated text", Computer Networks and ISDN Systems 30, 1998, 65-74.

Dayal, Umeshwar, "Database Technology at a Crossroads", ACM Computing Surveys 28, Dec. 1996,.

Mackinlay, Jock D. et al., "An Organic User Interface for Searching Citation Links", CHI 95 Mosaic of Creativity, ACM, May 7-11, 1995, 1-8.

Miller, Robert et al., "SPHINX: A framework for creating personal, site-specific Web Crawlers", Computer Networks and ISDN Systems, 1998, 119-130.

Terveen, Loren et al., "Constructing, Organizing, and Visualizing Collections of Topically Related Web Resources", ACM Transactions on Computer-Human Interaction, vol. 6, No. 1, Mar. 1999, 67-94.

Wu, Harris et al., "Document Co-Organization in an Online Knowledge Community", CHI 2004, ACM, Apr. 24-29, 2004.

The Open Directory, "DMOZ Open Directory Project", www.dmoz.org, available via Internet Archive Wayback Machine, 2008.

* cited by examiner

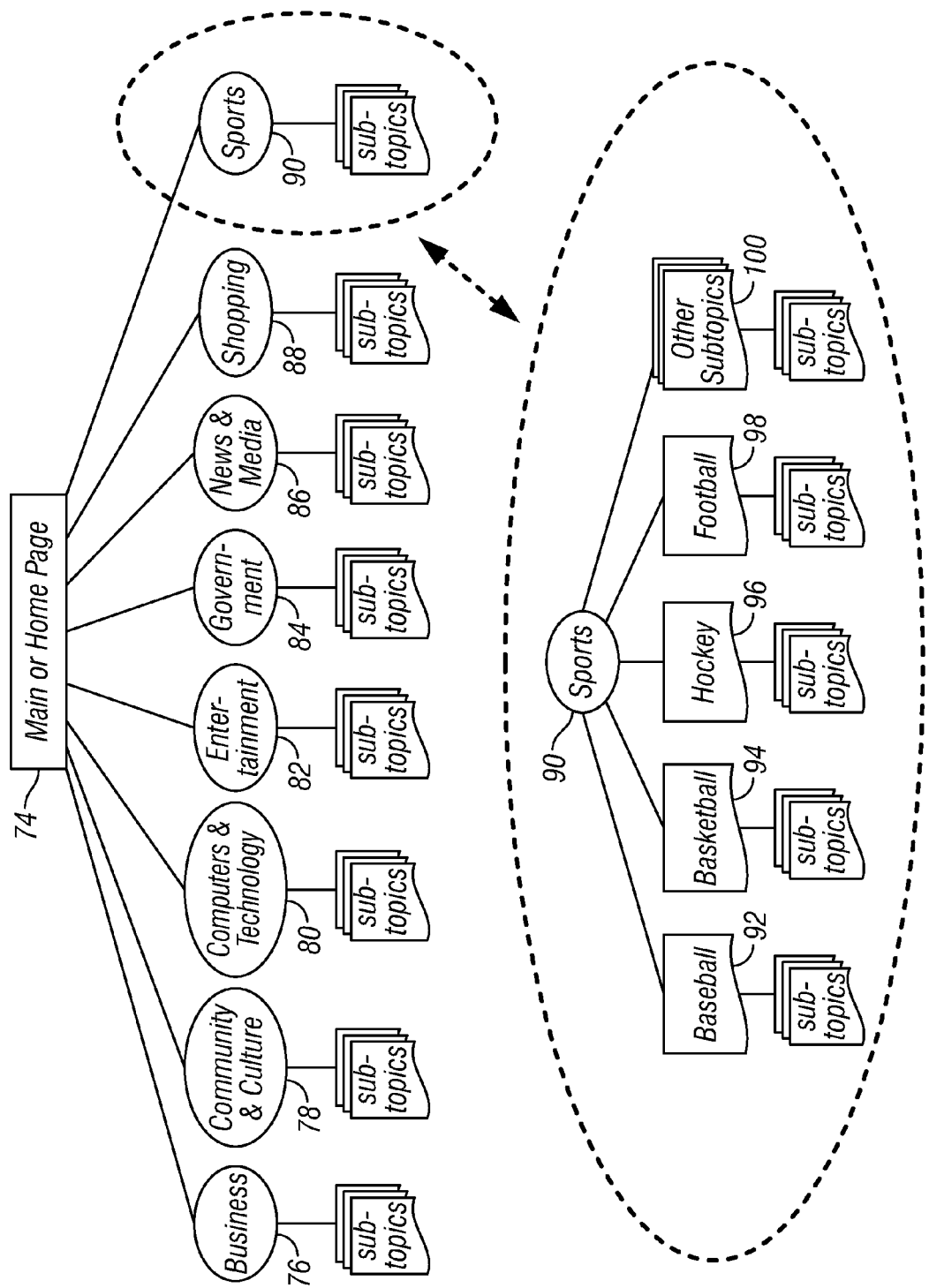

- Business
- Community and Culture
- Computers and Technology
- Entertainment
- Government
- News and Media
- Shopping
- Sports
  - 106

- Business
- Community and Culture
- Computers and Technology
- Entertainment
- Government
- News and Media
- Shopping
- Sports
  - Baseball
  - Basketball — 116
    - ABL
    - Books
    - CBA
    - Coaching
    - College
    - High School
    - IBL
    - International
    - ■ LINKS
    - Magazines
    - NBA
    - Players — 118
    - Trivia
    - WNBA
  - Cheerleading
  - Cricket
  - Curling
  - Field Hockey
  - Football
  - Hockey
  - Lacrosse
  - Polo
  - Rugby

- Business
- Community and Culture
- Computers and Technology
- Entertainment
- Government
- News and Media
- Shopping
- Sports
  - Baseball
  - Basketball
  - Cheerleading
  - Cricket
  - Curling
  - Field Hockey     } 110
  - Football
  - Hockey
  - Lacrosse
  - Polo
  - Rugby

- NBA — 120
  - Atlanta Hawks
  - Boston Celtics
  - Charlotte Hornets
  - Chicago Bulls
  - Cleveland Cavaliers
  - Dallas Mavericks
  - Denver Nuggets
  - Detroit Pistons
  - Golden State Warriors
  - Houston Rockets
  - Indiana Pacers
  - Los Angeles Clippers
  - Los Angeles Lakers
  - Miami Heat
  - Milwaukee Bucks
  - Minnesota Timberwolves
  - New Jersey Nets
  - New York Nicks
  - Orlando Magic
  - Philadelphia 76ers
  - Phoenix Suns
  - Portland Trailblazers
  - Sacramento Kings
  - San Antonio Spurs
  - Seattle Supersonics
  - Toronto Raptors
  - Utah Jazz
  - Vancouver Grizzlies
  - Washington Wizards

*FIG. 5*

DYNAMIC INDEX AND SEARCH ENGINE SERVER

CROSS-REFERENCE TO RELATED APPLICATIONS

This application is a continuation application of U.S. patent application Ser. No. 11/932,386, entitled Dynamic Index and Search Engine Server, to the present Applicants, filed on Oct. 31, 2007, which was a continuation-in-part application of U.S. patent application Ser. No. 09/641,031, entitled Dynamic Index and Search Engine Server, to the present Applicants, filed on Aug. 16, 2000, now U.S. Pat. No. 7,613,992, and that application claimed the benefit of the filing of U.S. Provisional Patent Application Ser. No. 60/149,322, entitled Dynamic Index and Search Engine Server, filed on Aug. 16, 1999, and the specifications thereof are incorporated herein by reference.

BACKGROUND OF THE INVENTION

1. Field of the Invention (Technical Field)

The present invention relates to Internet search indexes and engines.

2. Background Art

There are millions of World Wide Web ("web") sites on the Internet today, and so it is becoming increasingly difficult to index the available information quickly so that an individual can easily find the current and complete information (web sites) in which they have interest. Many search engines and search indexes on the web (hereafter web indexes) are simply too large to be useful. Sifting through the thousands of web sites that come from a single search or under a single topic (in an index) is often cumbersome and unfruitful.

The problem is two-fold. First, search indexes are very broad. Most people are not interested in every topic on the web; instead they are only interested in a small portion of the many topics that exist. Web users would like to have a web index that only encompasses their topics or subtopics of interest. But creating a customized web index is very time consuming and can be very expensive. Therefore, most people wade through many, many other topics to get to the few topics in which they have interest.

The second problem is with search engines on the web. The web is typically searched by keyword searches of the entire sampling of the web that has been indexed by any given search engine. These searches usually bring up a very large number of sites that have nothing to do with what the user intends to find. For example, someone searching for the poems of Robert Frost may simply type in the poet's name. The result, however, is often unproductive because most search engines can only search for the exact word or words and cannot put the word into context. Therefore the search results for "frost" may include the word "frost" in the wrong context such as in gardening tips. Another example is that a search for web sites about basketball courts may result in the word "court" being taken out of context and the searcher gets not only basketball courts (and other types of sports courts), but also get the supreme court, the court of appeals, etc.

The present invention provides a solution to the problems noted above by permitting individuals to create and organize search indexes specific to their needs.

SUMMARY OF THE INVENTION (DISCLOSURE OF THE INVENTION)

The present invention comprises an apparatus for, computer software for, and method of providing personalized search capabilities of hypertext transmission protocol pages comprising: providing an index server maintaining an index to hypertext transmission protocol pages and employing a hierarchical plurality of topic categories; permitting a user to specify any subset of the plurality of topic categories; and adding to a hypertext transmission protocol page controlled by the user link information permitting execution of searches of the index server in any category of the subset but only of categories in the subset. In the preferred embodiment, the user is permitted to propose addition of a hypertext transmission protocol page to the index server in conjunction with one or more categories of the subset, which causes automatic addition of the proposed page to the index server wherein the user can search the proposed page via the link information and wherein initially other users will not search the proposed page even if searching the proposed one or more categories. This preferably involves first verifying that a uniform resource locator address for the proposed page is valid and that the proposed page is not already indexed under the proposed one or more categories, as well as subsequently allowing other users to search the proposed page when searching one or more of the proposed one or more categories once suitable checks have been performed. The user can rename one or more categories of the subset as it will appear on the hypertext transmission protocol page controlled by the user, can rearrange hierarchicalization of one or more categories of the subset as it will appear on the hypertext transmission protocol page controlled by the user, and can within a branch of a hierarchy of categories either include or exclude subcategories in the branch, or both. The subset selection can be reexecuted by the user at any time, whereby the link information is dynamically updated to correspond to a new subset.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings:

FIG. 4 is a block diagram of a general web index.

FIG. 5 is a more specific block diagram of the preferred method and apparatus of viewing a general web index.

Figure 1:
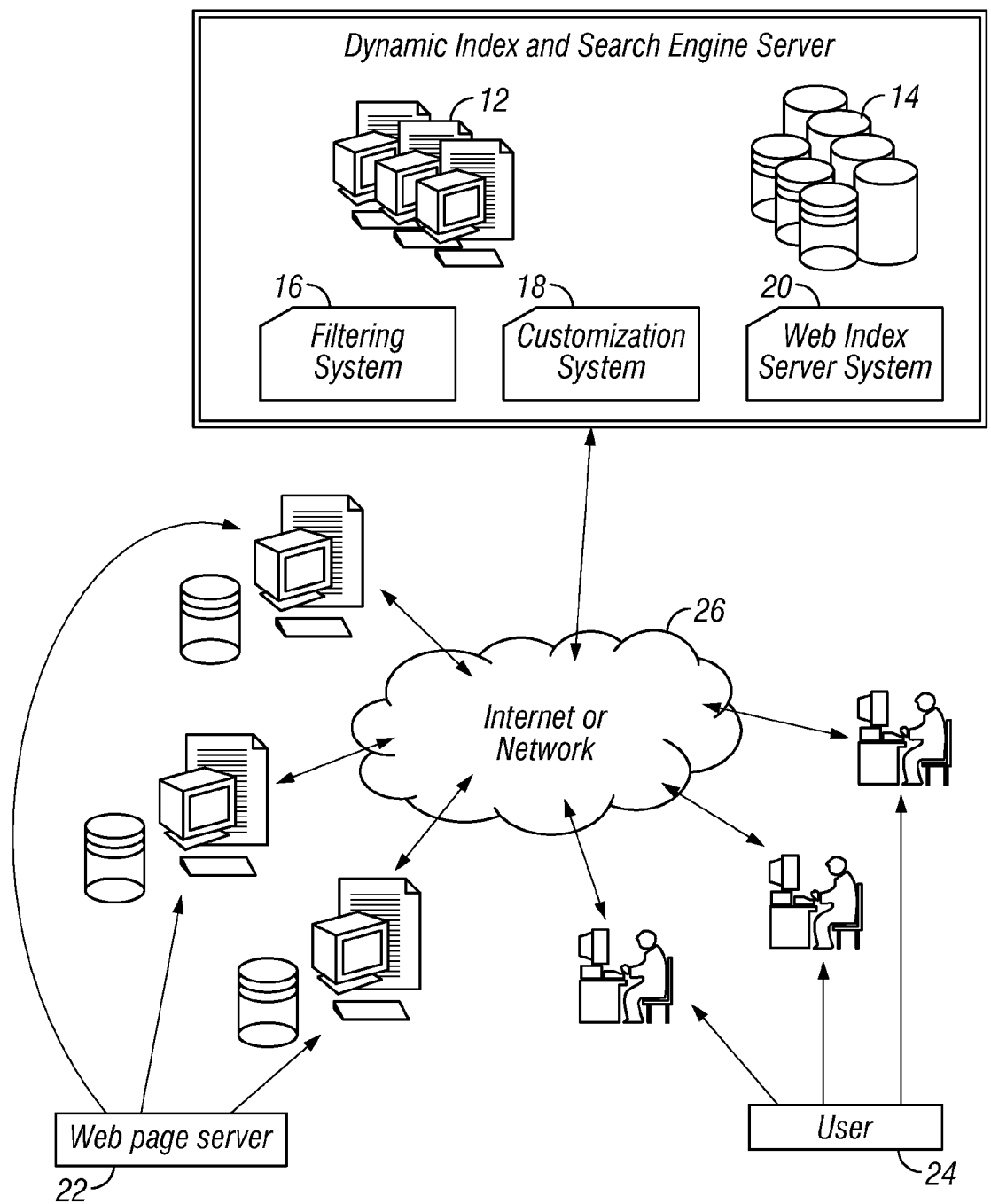
FIG. 1 is a general block diagram of the preferred method and apparatus of the invention.

DESCRIPTION OF THE PREFERRED EMBODIMENTS (BEST MODES FOR CARRYING OUT THE INVENTION)

The present invention is of a server method and apparatus to allow anyone to put a web index on their web site without having to update, store, check or catalogue any of the link information themselves, yet still allowing them to add web sites to the index. The web site owner can customize several aspects of the look and feel of the web index, then choose a subset of the topics available or choose all topics.

Take as an example a young girl maintaining a personal web site. The present invention allows her or her parents to set up a customized index on her web site. She might choose to have her topics be:

Barbie® and Friends
Toys
Games

With the present invention, when she browses using her web site she does not have to wade through other topics to get to her three topics of choice. Furthermore, because the present invention will exclude all other topics from her customized web index, a search of her index will provide her a more useable set of results—only on her topics. She can search for the words "Barbie" or "Ken," and because the search would only be on the web sites included in her particular topics, she would get very meaningful results.

The web site owner can also arrange the topics in a personalized hierarchy or keep the default hierarchy. For example, if someone included a Sports topic on their web index, they could arrange the links within Sports and even change the name of the topics. As just one example, they could take a sports topic with subtopics of Baseball, Basketball, Cheerleading, Cricket, Curling, Field Hockey, Football, Hockey, Lacrosse and Polo as follows:

Sports
   Baseball
   Basketball
   Cheerleading
   Cricket
   Curling
   Field Hockey
   Football
   Hockey
   Lacrosse
   Polo and rearrange it to make some of the subtopics main links on the resulting customized web index, such as follows:

Baseball
Basketball—The Best Sport!!
Hockey
Football
Other Sports
   Cheerleading
   Cricket
   Curling
   Field Hockey
   Lacrosse
   Polo
   Rugby This example illustrates that not only can the web site owner change the hierarchy, but also change the names of the subtopics, making a truly unique web index. This is just one example of how the hierarchy and topic names could be changed. The possibilities are, as is readily understood, endless.

In order to obtain a customized web index for their web site, a web site owner would connect to the Dynamic Index and Search Engine Server ("DISE Server") of the invention to set up their custom index. This would preferably include:

Setting the look and feel of the web index
Choosing the topics to be included
Rearranging topics (changing hierarchy)
Adding new topics
Renaming existing topics After the web site owner has customized the DISE Server for their web site, they are provided a unique DISE Server Connector ("DSC") to place on their web site. The DSC is a gateway to the DISE Server that connects the web site to the DISE Server so that when someone accesses a web page containing the DSC, the DISE Server is accessed and the customized information is included on the web page.

A very important part of this invention is that the web index is dynamically included on the web page. Therefore, the DISE Server is able to update, store, check and catalogue the link information and any changes are instantaneously seen on the web indexes. In this way the web site owner does not have to update his links; he does not have to make sure they are still valid. The DISE Server handles all the work for him. However, the web site owner can add links to his web index.

Everyone with a DISE Server customized web index on their web site will be able to request to add links to their web index. This request will include information about the link as well as the suggested topic in which to include the link. When the DISE Server receives the request, it puts the request through a series of filters to determine if the link is valid. If a link is deemed valid, it is added to the requester's web page. The link request is then sent through a second filtering process to see if it should be added to the global DISE Server index. If this second filtering process determines that the link should be added to the global index (DISE Server), the link will be added and, therefore, will automatically be added to all web indexes that contain the topic.

In this manner the web site owner is spared the expense and time it takes to maintain a web index while still being able to dynamically add links to their web index.

Furthermore, by allowing all web site owners to add to the global index, each topic will be more complete. The web site owners can update the topics of interest to them, as they use their own customized index, and every other user will benefit by having the global information in each topic updated much faster and more efficiently.

The present invention allows for an unlimited number of new, yet completely distinct, indexes, which can be created by any number of individuals, companies, groups and organizations. In other words, this technology enables any individual, company or organization to put up their own web index—each with its own look, feel, and method of organizing and prioritizing links. Furthermore, when someone does a keyword search on a web site with a DISE Server customized web index, they are only searching the subset of web sites that are included in this particular web index, and not the entire web. This creates much more relevant search results.

It is important to note that this invention works with any search technology available at this time or invented in the future. It is not particularly relevant to the invention how web sites are searched, but rather that only the customized subset is searched.

A generalized networked computer system consistent with the present invention is shown in FIG. 1. Web page servers (22) are attached to the Internet (26). These servers contain web pages that will be linked from a web index as well as web pages that will utilize the DISE Server to have dynamic web indexes. User computer systems (24) capable of executing a Web browser are coupled logically through a network (26), such as the internet, to any number of web page servers (22).

The present invention preferably encompasses any number of logical and physical computer systems (12) with access to one or more individual databases (14), a database management system (14), a system to implement the customization (18), a system to add and filter links (16), and a system to serve the web indexes dynamically (20). The present invention includes a global index of web pages and one or more methods of searching those web pages. The present invention also includes a default topic structure or hierarchy to contain the global index. Each topic will contain one or more subtopics and one or more links to external, relevant web pages (hereafter external links) under that topic.

Figure 2:
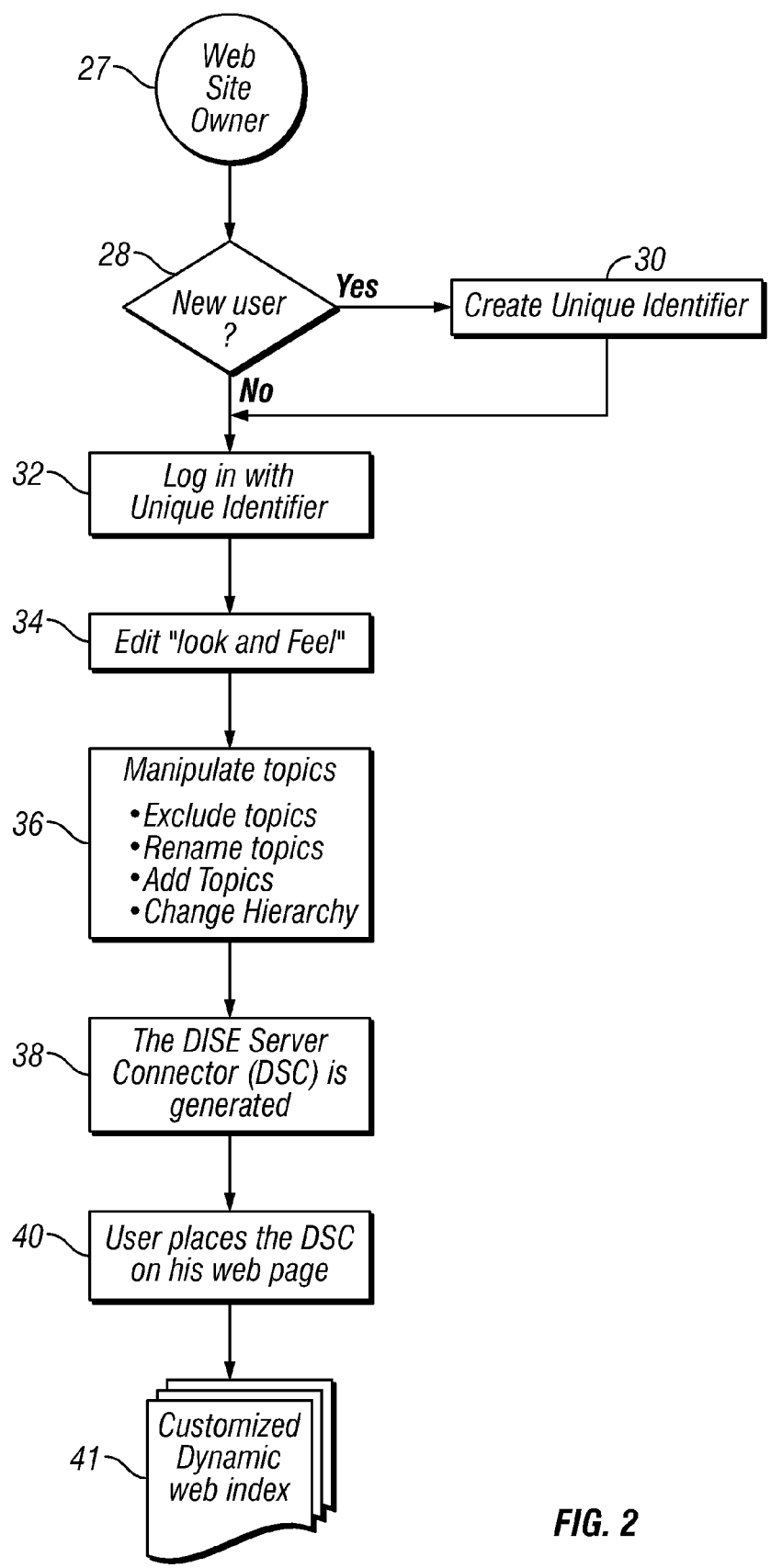
FIG. 2 is a block diagram of the preferred method and apparatus of the customization of web indexes.

When an individual or company (web site owner) chooses to use the DISE Server to incorporate a web index on their web site, they must first set up their customization. FIG. 2 is a generalized flowchart of the process of customizing an individual web index. In the preferred embodiment, the web site owner (27) must set up a unique account in order to store and retrieve the web site owner's web index setup. If he has not yet set up an account (28), he will need to go through the process to obtain a unique identifier (30). He can then login (32) and customize many aspects of the look and feel (34), including, but not limited to fonts (size, color, link color, visited link color, etc.), number of columns on the home page and on subsequent pages, whether subtopics will appear on the home page, etc. The web site owner can then completely customize the topic, including the hierarchy and the topic names (36).

FIGS. 4-7 illustrate the customization of a web index. FIG. 4 is a general block diagram of a possible web index. There is a main page or home page (74) with link to topics (76, 78, 80, 82, 84, 86, 88 and 90). These subtopics in turn have their own subtopics. One such set of sub-subtopics is shown in FIG. 4 (92, 94, 96, 98, 100).

FIG. 5 shows an example of how the web site owner might browse through the topics. In the preferred embodiment the web site owner is able to customize the topics by manipulating folders, as on computer, that represent the topics and subtopics. In this example the sports topic (106) is clicked on to reveal its subtopics (110). Under the sports topic there are many other subtopics including basketball (116). Under Basketball there are several subtopics, including NBA (118). When NBA is clicked on, it is seen that there are also subtopics under NBA (120).

Figure 6:
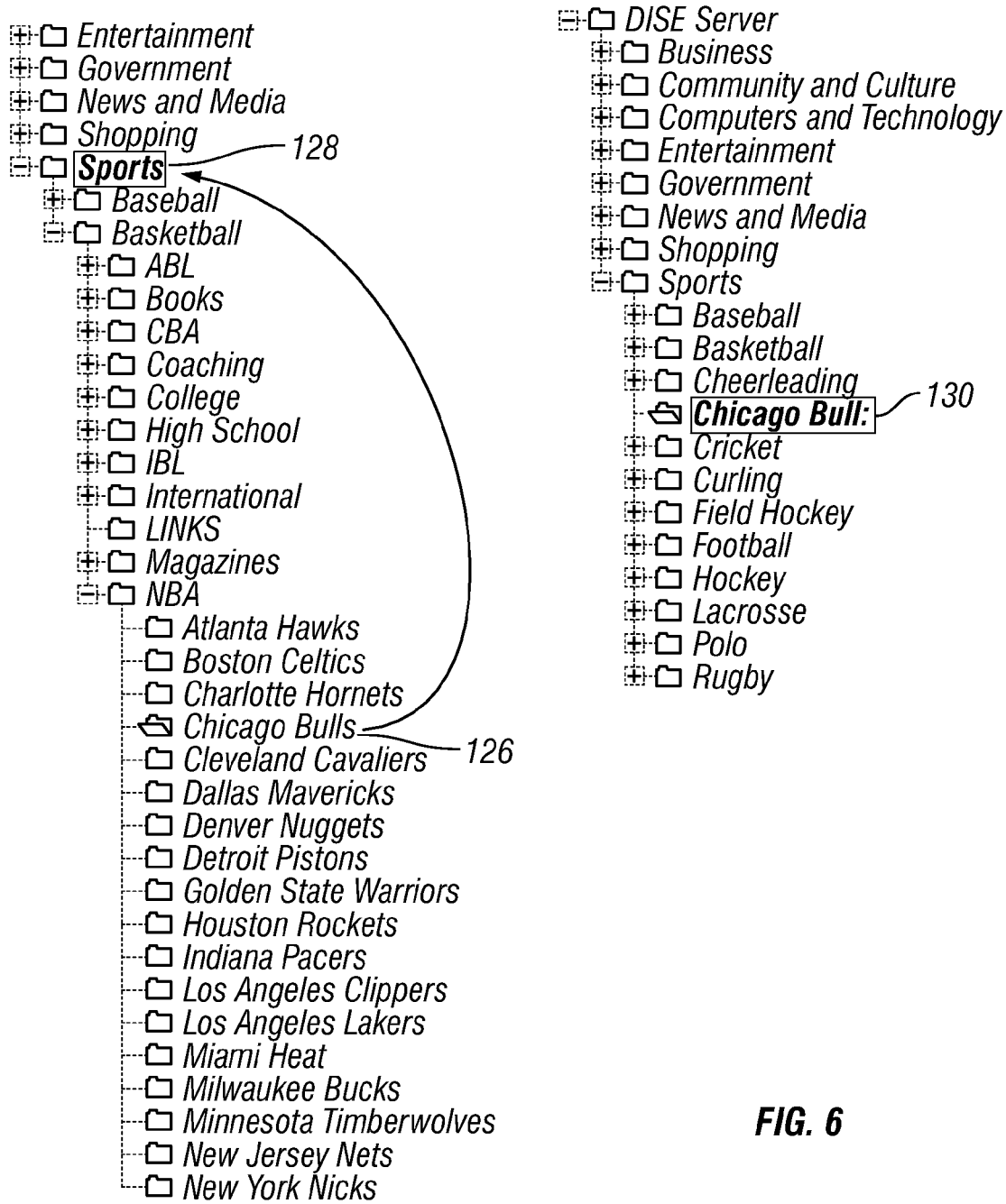
FIG. 6 is a block diagram of an example of changing the topical hierarchy.

To customize his web index, the web site owner will be able to move any subtopic to a different level or under a different topic. FIG. 6 shows how a subtopic might be clicked and dragged to a new topic. This is very much the same way file and folders are typically moved around on computers today. Specifically, in this example the "Chicago Bulls" subtopic (126) is moved above its current parent topic of basketball directly into the Sports topic (128), so that the topic "Chicago Bulls" is now a subtopic of Sports (130).

Figure 7:
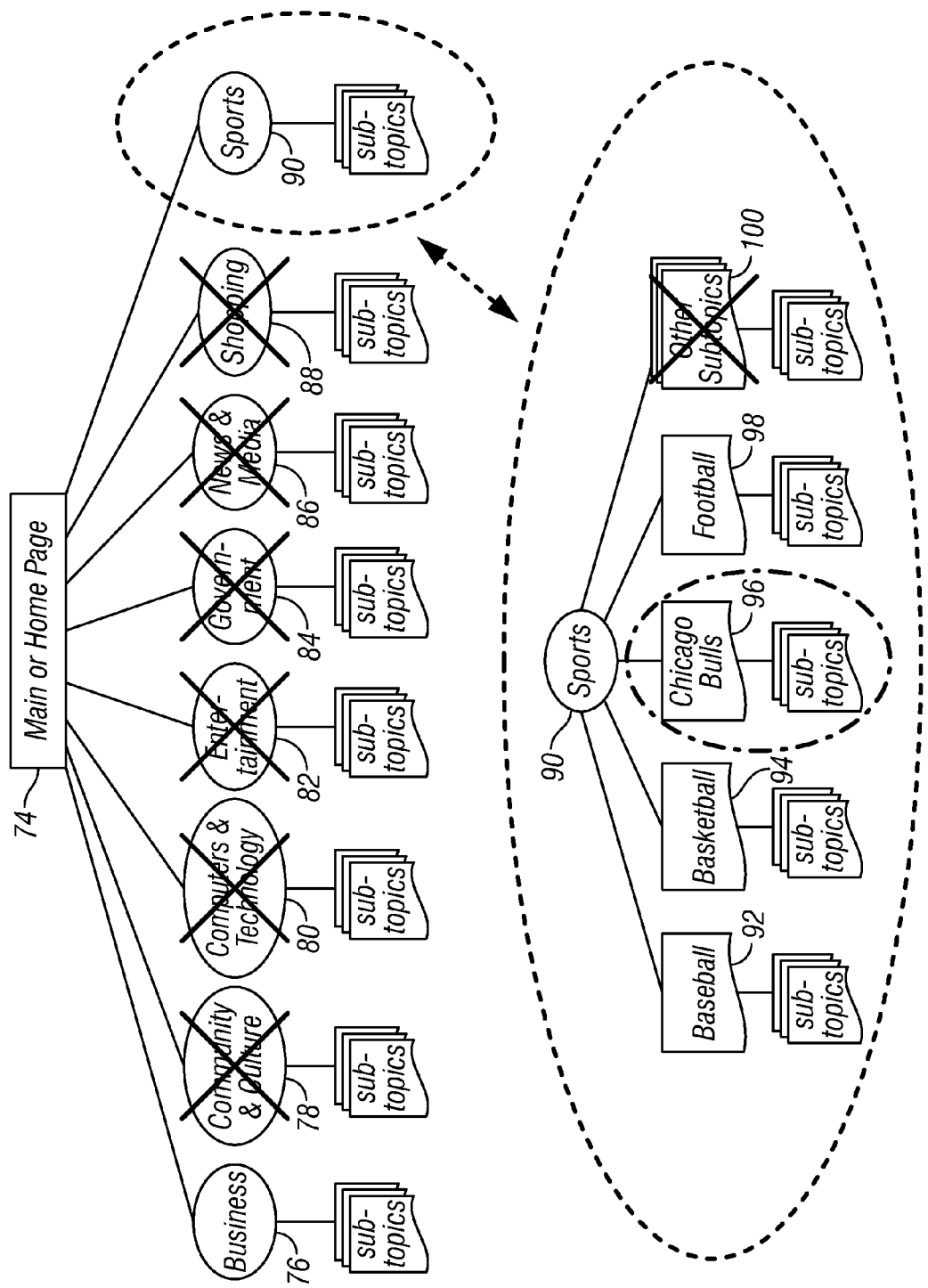
FIG. 7 is a block diagram of the preferred method and apparatus for excluding and setting up topics to customize.
Figure 8:
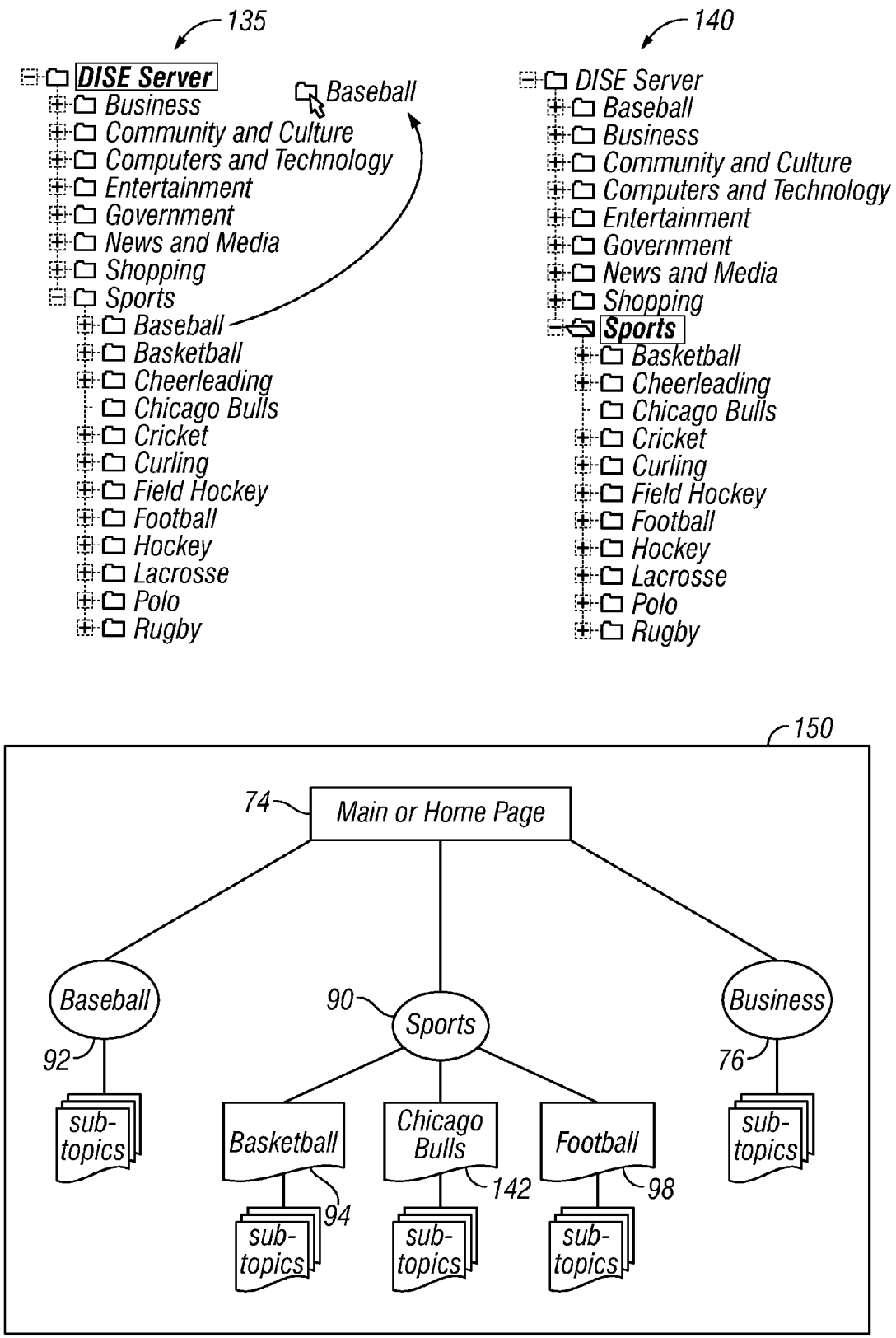
FIG. 8 is a block diagram illustrating the results of the operation of FIG. 7.

To specify topics that the web user does not want included, he can simply mark them to be taken off. FIG. 7 illustrates this feature of the invention. The subtopics that are not to be included are simply "turned off" (78, 80, 82, 84, 86, 88, 100). FIG. 8 shows how this appears to the user in the preferred embodiment. The topics that turned off are "ghosted." In other words, the folder representing those topics is changed to a different, much lighter color (135). To further show the customization of the topical hierarchy, FIG. 8 shows how the "Baseball" subtopic might be moved from "Sports" to be a top-level topic (135, 140). FIG. 8 then shows how the hierarchy might look to the user (150). In this example, the main topics are Baseball (92), Sports (90) (including subtopic Chicago Bulls (142)), and Business (76). Other customization of the topics can also be performed, including changing the name of any topic and creating new topics.

In the preferred embodiment, the external links that fall under any topic will stay under that topic at all times, whether the topic is moved or renamed, although provision for the external links to be moved under different topics certainly falls within the scope of the invention.

After the web site owner has customized the topics, his preferences are stored. In the preferred embodiment, the preferences are stored in a database, although any reasonable storage method would fall within the scope of the invention.

The present invention then generates the unique DISE server connector ("DSC") for the web site owner (38). The DSC is source code that is placed on the web site (40) to add the dynamic index to the site. This DSC source code could be implemented in HTML, XML, SGML, Java, ASP, or any other feasible source code options for web sites. The preferred embodiment has many types of DSC source code options to accommodate the many web site hosting environments available now or in the future.

Individuals and companies host their web sites on one or more web servers. These web servers store the individual web pages that make up the web sites along with any number of programs, database, etc., which encompass the web site. Since web servers vary so widely, and the technology is constantly changing, it is difficult to choose one particular implementation. The key to the DSC is that it will connect to the present invention over the Internet and dynamically include language that represents the dynamic index.

In the preferred embodiment, when the index is placed on the web page some other information and features appear on the page as well (herein called other information). This other information preferably includes:

1. Banner advertisements or other advertisements;
2. A way to add new links;
3. A copyright statement;
4. An ownership statement;
5. Links to a web page containing information about the present invention;
6. A search box enabling a search of the customized index or the entire web; and
7. A way to reconfigure the web index.

In the preferred embodiment, the banner advertisements are optional, but there are preferably other mandatory information that must be included with the web index.

Once the web site owner places the DSC on his web page, the code will be activated when any web browser views the web page. When a web user (24) views the web page, the unique customized web index and other information for that web page will appear on the web page dynamically (41).

At any time the web site owner can reconfigure his settings of the present invention, allowing him to change his customized web index. In the preferred embodiment, a new DSC is not be required for every reconfiguration, although requiring that the DSC be changed after each reconfiguration is within the scope of the present invention.

Figure 3:
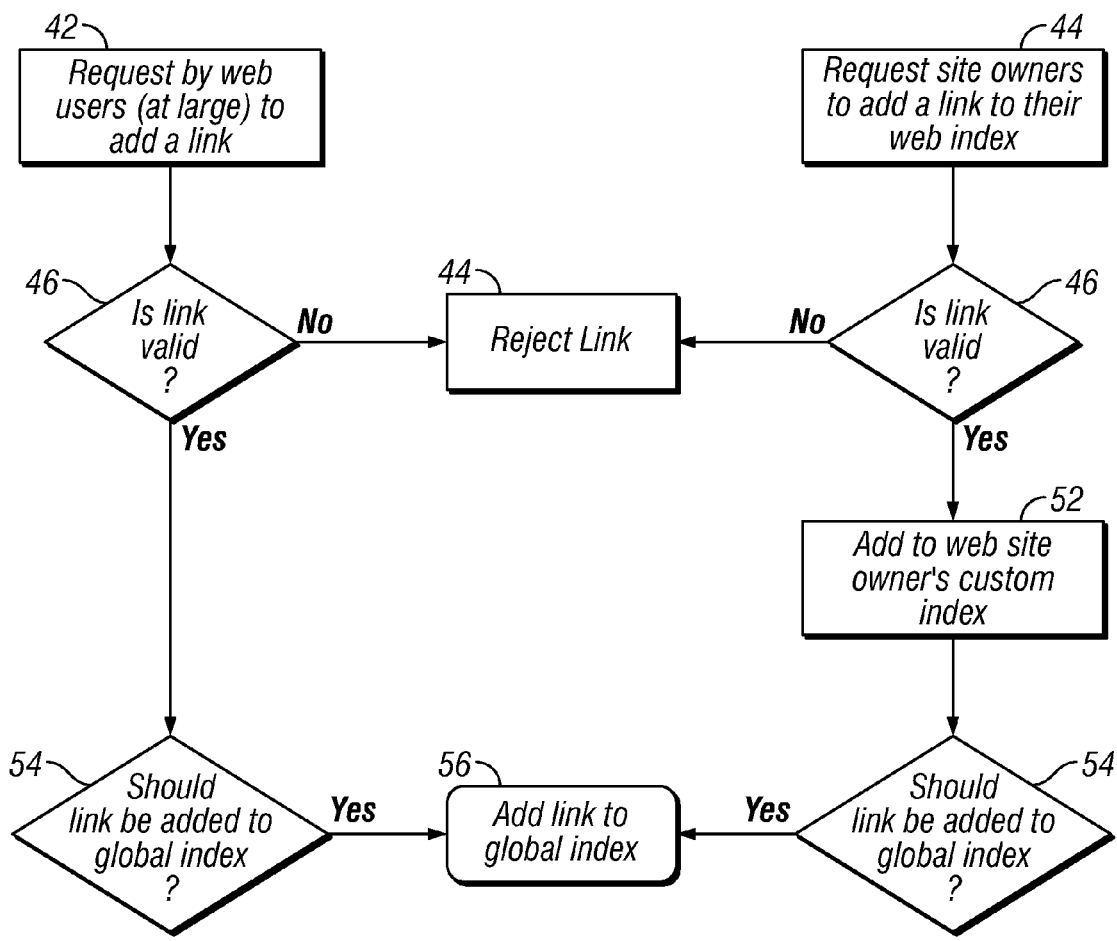
FIG. 3 is a block diagram of the preferred method and apparatus of the system to add and filter links.

In the preferred embodiment, anyone who uses any of the customized web indexes can suggest links to be added to the web index. These suggestions include the suggested link, the suggested title of the link the suggested link description and the topic in which to include the link. FIG. 3 shows a generalized block diagram of user-added links to the system. Before one of the "at-large" link requests (42) are incorporated into the global index, the link suggestions are preferably filtered through two filtering processes: 1) a filtering process to determine whether the link is valid (46); and 2) a filtering process to determine whether the link should be added to the global index (54).

The first filtering process, to test whether the link is valid (46), preferably includes, but is not necessarily limited to:

1. Checking if the link is a valid web page;
2. Making sure that the same link has not already been added to the specified topic; and
3. Checking that the title of the link of words used to describe the link meet certain criteria (e.g., no profanity, etc.)

The second filtering process to determine whether the link should be added to the global index (54) preferably includes, but is not necessarily limited to:

1. Checking to make sure that the suggested link is appropriate for the topic;
2. Checking to make sure that the proposed description and title of the link are appropriate; and
3. Checking to make sure that the proposed description and title of the link are descriptive of the contents of the link.

However, the web site owner who has included a customized web index on his web site will have more choices. He can add a link to his index dynamically. If the web site owner suggests a link (44), his request is only put through the first filtering process to test that the link is valid (46) before it is included on his web site. If the link is deemed valid then the link is added to the requester's web index (52). In the preferred embodiment the filtering process is done electronically so that the link will be added to the requesting web site owner's web site immediately.

Furthermore, every link suggestion posted by a web site owner is preferably also being sent through the second filtering process to determine whether the link should be added to the global index (54). In this manner, as each individual updates his or her web index, the global web index is updated (56) as well allowing for a much more complete index than could otherwise be accomplished.

It is important to note that under the present invention it is also possible for the web site owner to exclude individual links from his web page. This feature is not included in the preferred embodiment because of the complexity of keeping track of whether one link should be included in any number of web sites.

A novel and additional feature of the invention is that the customized index can be employed as an inclusion filter for web content. Many people use filters on the Internet to disallow browsing of inappropriate web sites. Many people and businesses use filters so that no one can browse pornography or other web sites deemed inappropriate. With the present invention, a user can set up their customized web index and then employ that index as an inclusion filter set into place so that the user can only browse web sites that are included in the index. A good example of this is a filter for use by a child. Many web filters exist for children and, in fact, many of the largest Internet Service Providers (ISPs) have child filters. But if a user uses one of these established child filters then they are letting someone else decide which web sites are appropriate for their children. Instead, with the present invention, the parent can use the invention to customize a web index, excluding all the topics that they deem inappropriate for their children, and then use it as an inclusion filter. The children would then only be able to view web pages that were included in the topics of the index customized by the parent.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method of providing personalized search capabilities of internet web pages, the method comprising the steps of:
   a) providing an index server maintaining dynamic indices to internet web pages and employing a preexisting tree-structured hierarchical plurality of topic categories whose contents, including topics and links not provided by a particular end user, are maintained and updated by the index server without end user intervention being required, wherein a master index is maintained as well as an end user's index for each user as customized by each user;
   b) permitting the end user to specify any subset of the plurality of topic categories in the end user's index;
   c) adding to an electronic medium controlled by the end user link information permitting execution of searches of the index server in any category of the subset but only of categories in the subset;
   d) permitting the end user to propose addition of an internet web page to the master index in conjunction with one or more categories of the subset; and
   e) automatically adding the proposed page to the end user's index wherein the end user can search the proposed page via the link information and wherein initially other users will not search the proposed page even if searching the proposed one or more categories; and
   wherein the index server updates web pages in the topic categories of the master index and the end user's index without any end user intervention.

2. The method of claim 1 wherein the automatically adding step comprises the steps of verifying that a uniform resource locator address for the proposed page is valid and that the proposed page is not already indexed under the proposed one or more categories.

3. The method of claim 1 additionally comprising the step subsequently allowing other users to search the proposed page when searching one or more of the proposed one or more categories.

4. The method of claim 1 additionally comprising the step of allowing the end user to rename one or more categories of the subset as it will appear on the electronic medium controlled by the end user.

5. The method of claim 1 additionally comprising the step of allowing the end user to rearrange hierarchicalization of one or more categories of the subset as it will appear on the electronic medium controlled by the end user.

6. The method of claim 1 wherein the permitting step comprises permitting the end user within a branch of a hierarchy of categories to either include or exclude subcategories in the branch, or both.

7. The method of claim 1 wherein step b) is reexecutable by the end user at any time, whereby the link information is dynamically updated to correspond to a new subset.

8. An apparatus providing personalized search capabilities of internet web pages, said apparatus comprising:
   an index server maintaining dynamic indices to internet web pages and employing a preexisting tree-structured hierarchical plurality of topic categories whose contents, including topics and links not provided by a particular end user, are maintained and updated by said index server without end user intervention being required, wherein a master index is maintained as well as an end user's index for each user as customized by each user;

a link permitting the end user to specify any subset of said plurality of topic categories in the end user's index;

a link adding to an electronic medium controlled by the end user link information permitting execution of searches of said index server in any category of said subset but only of categories in said subset; and a link permitting the end user to propose addition of an internet web page to said master index in conjunction with one or more categories of said subset and automatically adding said proposed page to said end user's index wherein the end user can search said proposed page via said link information and wherein initially other users will not search said proposed page even if searching said proposed one or more categories; and wherein the index server updates web pages in the topic categories of the master index and the end user's index without any end user intervention.

9. The apparatus of claim 8 wherein said index server verifies that a uniform resource locator address for said proposed page is valid and that said proposed page is not already indexed under said proposed one or more categories.

10. The apparatus of claim 8 additionally comprising means for subsequently allowing other users to search the proposed page when searching one or more of the proposed one or more categories.

11. The apparatus of claim 8 additionally comprising a link allowing the end user to rename one or more categories of said subset as it will appear on said electronic medium controlled by the end user.

12. The apparatus of claim 8 additionally comprising a link allowing the end user to rearrange hierarchicalization of one or more categories of said subset as it will appear on said electronic medium controlled by the end user.

13. The apparatus of claim 8 wherein said permitting link comprises means for invoking means permitting the end user within a branch of a hierarchy of categories to either include or exclude subcategories in said branch, or both.

14. The apparatus of claim 8 wherein said permitting link is reexecutable by the end user at any time, whereby said link information is dynamically updated to correspond to a new subset.

15. A computer readable medium comprising computer software stored thereon providing personalized search capabilities of internet web pages, said software comprising:

index server code maintaining dynamic indices to internet web pages and employing a preexisting tree-structured hierarchical plurality of topic categories whose contents, including topics and links not provided by a particular end user, are maintained and updated by said index server code without end user intervention being required, wherein a master index is maintained as well as an end user's index for each user as customized by each user;

link code permitting the end user to specify any subset of said plurality of topic categories in the end user's index;

link code adding to an electronic medium controlled by the end user link information permitting execution of searches via said index server code in any category of said subset but only of categories in said subset; and link code permitting the end user to propose addition of an internet web page to said master index code in conjunction with one or more categories of said subset and automatically adding said proposed page to those indexed by said end user's index code wherein the end user can search said proposed page via said link information and wherein initially other users will not search said proposed page even if searching said proposed one or more categories; and wherein the index server updates web pages in the topic categories of the master index and the end user's index without any end user intervention.

16. The computer readable medium of claim 15 wherein the proposed adding link comprises code for invoking verification that a uniform resource locator address for said proposed page is valid and that said proposed page is not already indexed under said proposed one or more categories.

17. The computer readable medium of claim 15 additionally comprising code for subsequently allowing other users to search the proposed page when searching one or more of the proposed one or more categories.

18. The computer readable medium of claim 15 additionally comprising link code allowing the end user to rename one or more categories of said subset as it will appear on said electronic medium controlled by the end user.

19. The computer readable medium of claim 15 additionally comprising link code allowing the end user to rearrange hierarchicalization of one or more categories of said subset as it will appear on said electronic medium controlled by the end user.

20. The computer readable medium of claim 15 wherein said permitting link code comprises code for invoking code permitting the end user within a branch of a hierarchy of categories to either include or exclude subcategories in said branch, or both.

21. The computer readable medium of claim 15 wherein said permitting code is reexecutable by the end user at any time, whereby said link information is dynamically updated to correspond to a new subset.

22. A method of providing personalized search capabilities of internet web pages, the method comprising the steps of:

a) providing an index server maintaining dynamic indices to internet web pages and employing a preexisting tree-structured hierarchical plurality of topic categories whose contents, including topics and links not provided by a particular end user, are maintained and updated by the index server without end user intervention being required, wherein a master index is maintained as well as an end user's index for each user as customized by each user;

b) permitting the end user to specify any subset of the plurality of topic categories in the end user's index;

c) at request of the end user, executing a search of the index server in any category of the subset but only of categories in the subset;

d) permitting the end user to propose addition of an internet web page to the master index in conjunction with one or more categories of the subset; and e) automatically adding the proposed page to the end user's index wherein the end user can search the proposed page via the link information and wherein initially other users will not search the proposed page even if searching the proposed one or more categories; and wherein the index server updates web pages in the topic categories of the master index and the end user's index without any end user intervention.

* * * * *